(12) United States Patent
Valencia et al.

(10) Patent No.: US 9,809,332 B2
(45) Date of Patent: Nov. 7, 2017

(54) LIDDING DEVICE

(71) Applicant: WestRock Shared Services, LLC, Norcross, GA (US)

(72) Inventors: John Valencia, Johns Creek, GA (US); Patrick Shields, Tucker, GA (US); Thomas Edward Zappa, Maplewood, MN (US)

(73) Assignee: WestRock Shared Services, LLC, Norcross, GA (US)

( * ) Notice: Subject to any disclaimer, the term of this patent is extended or adjusted under 35 U.S.C. 154(b) by 135 days.

(21) Appl. No.: 13/832,606

(22) Filed: Mar. 15, 2013

(65) Prior Publication Data

US 2014/0123607 A1     May 8, 2014

Related U.S. Application Data

(60) Provisional application No. 61/721,933, filed on Nov. 2, 2012.

(51) Int. Cl.
*B65B 7/00* (2006.01)
*B29C 65/00* (2006.01)
(Continued)

(52) U.S. Cl.
CPC .......... *B65B 5/024* (2013.01); *B65D 51/1672* (2013.01); *B65D 77/2024* (2013.01);
(Continued)

(58) Field of Classification Search
CPC .............. B29C 66/534; B29C 66/5342; B29C 66/53421; B29C 66/53425; B29C 65/02; B29C 65/18; B65D 4/4295; B65D 4/54; B65D 4/545; B65D 4/5455; B65D 2205/00; B65D 2571/0066; B65D 81/34; B65D 81/3453; B32B 27/00; B32B 27/04; B32B 27/06; B32B 27/10; B32B 29/00;
(Continued)

(56) References Cited

U.S. PATENT DOCUMENTS 3,158,491 A * 11/1964 Farrell ............... B65D 77/2056
206/557
4,215,781 A * 8/1980 Humphries et al. .......... 206/434
(Continued)

FOREIGN PATENT DOCUMENTS

WO    WO 2011032144 A2 *   3/2011      B65D 75/008

*Primary Examiner* — Philip Tucker
*Assistant Examiner* — Brian R Slawski
(74) *Attorney, Agent, or Firm* — WestRock IP Legal

(57) ABSTRACT

Embodiments of the present invention provide a three-panel lidding device used to seal a food container. Such devices are particularly useful for covering and sealing a plastic food container, eliminating (or diminishing) the need for an outer carton and the clear film membrane that traditionally covers a food container. The lidding device may contain all brand identifiers, product messaging, ingredient list, instructions (e.g., opening and cooking) printed directly on the device. The device may also allow for venting of the food container during cooking and may then be removed for serving. The device may further provide a foot panel that allows the food product container/lidding device to sit upright, enhancing store front and freezer display options.

1 Claim, 8 Drawing Sheets

(51) Int. Cl.
  *B32B 37/00* (2006.01)
  *C09J 5/02* (2006.01)
  *B65B 51/10* (2006.01)
  *B67B 1/00* (2006.01)
  *B67B 3/00* (2006.01)
  *B67B 5/00* (2006.01)
  *B65B 7/28* (2006.01)
  *B65B 5/02* (2006.01)
  *B65D 77/20* (2006.01)
  *B65D 77/22* (2006.01)
  *B65D 81/34* (2006.01)
  *B65D 51/16* (2006.01)
  *B32B 29/00* (2006.01)
  *B29C 65/02* (2006.01)
  *B32B 27/10* (2006.01)
  *B29C 65/48* (2006.01)

(52) U.S. Cl.
  CPC ....... *B65D 77/2032* (2013.01); *B65D 77/225* (2013.01); *B65D 81/3453* (2013.01); *B29C 65/02* (2013.01); *B29C 65/4815* (2013.01); *B29C 66/53461* (2013.01); *B32B 27/10* (2013.01); *B32B 29/002* (2013.01)

(58) Field of Classification Search
  CPC ....... B32B 29/002; B65B 5/024; B65B 51/02; B65B 51/10; B65B 7/2842; B65B 7/2871; B65B 7/2878; B31B 3/26
  USPC ........ 156/60, 69, 277, 278, 279, 292, 308.2, 156/308.4, 308.6, 309.3, 309.6; 53/396, 53/397, 461, 462, 463, 466, 476, 477, 53/478, 484, 485, 285, 287; 493/51, 52, 493/53, 55, 148, 150, 151, 374, 377, 162, 493/183; 229/103.2, 117.29, 117.3, 229/117.31, 120, 200, 237, 240, 242, 243, 229/244
  See application file for complete search history.

(56) References Cited

U.S. PATENT DOCUMENTS

| | | | | |
|---|---|---|---|---|
| 4,962,849 | A | * | 10/1990 | Anderson ................ 206/45.24 |
| 4,978,056 | A | * | 12/1990 | Ball et al. ................ 229/123.2 |
| 5,419,486 | A | * | 5/1995 | Bennett et al. ................ 229/109 |
| 5,423,449 | A | * | 6/1995 | Gordon ............. B65D 77/2056 206/557 |
| 5,492,703 | A | * | 2/1996 | Gics ................ B65D 25/205 206/459.5 |
| 5,743,402 | A | * | 4/1998 | Gics .................. B65D 77/0433 206/459.5 |
| 5,839,574 | A | * | 11/1998 | Lorence et al. ............. 206/216 |
| 5,853,860 | A | * | 12/1998 | Calvert ........................ 428/204 |
| 5,900,264 | A | * | 5/1999 | Gics .................... 426/107 |
| 6,026,956 | A | * | 2/2000 | Jensen .................... B65D 5/56 206/459.1 |
| 6,145,736 | A | * | 11/2000 | Ours et al. .................. 229/117.3 |
| 2006/0191811 | A1 | * | 8/2006 | Fogle .................... B65D 71/14 206/434 |
| 2009/0078698 | A1 | * | 3/2009 | Middleton et al. ........... 219/729 |

* cited by examiner

LIDDING DEVICE

CROSS REFERENCE TO RELATED APPLICATIONS

This application claims the benefit of U.S. Provisional Application Ser. No. 61/721,933, filed Nov. 2, 2012, titled "Paperboard Lidding Device," the entire contents of which are hereby incorporated by reference.

FIELD OF THE INVENTION

Embodiments of the present invention relate generally to a three-panel lidding device used to seal a food container. Such devices are particularly useful for covering and sealing a plastic food container, eliminating (or diminishing) the need for an outer carton and the clear film membrane that traditionally covers a food container. The lidding device may contain all brand identifiers, product messaging, ingredient list, instructions (e.g., opening and cooking) printed directly on the device. The device may also allow for venting of the food container during cooking and may then be removed for serving. The device may further provide a foot panel that allows the food product container/lidding device to sit upright, enhancing store front and freezer display options.

BACKGROUND

Frozen and microwavable foods are becoming more and more popular, in light of their convenience and the explosion of new food offerings becoming available. Frozen foods are easy to store, transport, and serve. Other types of foods are also sold in stores as pre-prepared and ready for immediate cooking or microwaving. The packaging of these foods typically uses a clear plastic film that covers the food product inside the food container or bowl, as well as an outer package or box in which the food container is housed. In use, the consumer must open the box, cut or remove the plastic film in order to vent the food during cooking, cook/microwave the food, then discard the box and film. There are, however, instances when the film is not properly vented or when the user does not have the proper tool (e.g., knife or scissors) to vent the film, causing undesirable mistakes in the food cooking process. Providing both a plastic film and a packaging box also creates undesirable waste. Accordingly, improvements in the packaging of pre-prepared food products are desirable.

BRIEF SUMMARY

Embodiments of the invention described herein thus provide a lidding device, such as a paperboard lidding device, that can be used to cover a food product container. In some embodiments, the lidding device may be used to seal a container, such as but not limited to, a plastic container housing frozen food that is intended to be frozen and/or defrosted and/or heated by use of a microwave or other oven. The lidding device eliminates the need for an outer carton as well as a clear film membrane that traditionally covers the plastic food container. In some embodiments, the carton may be configured for re-use, recyclability, biodegradability, and/or compostability.

DETAILED DESCRIPTION

Figure 1:
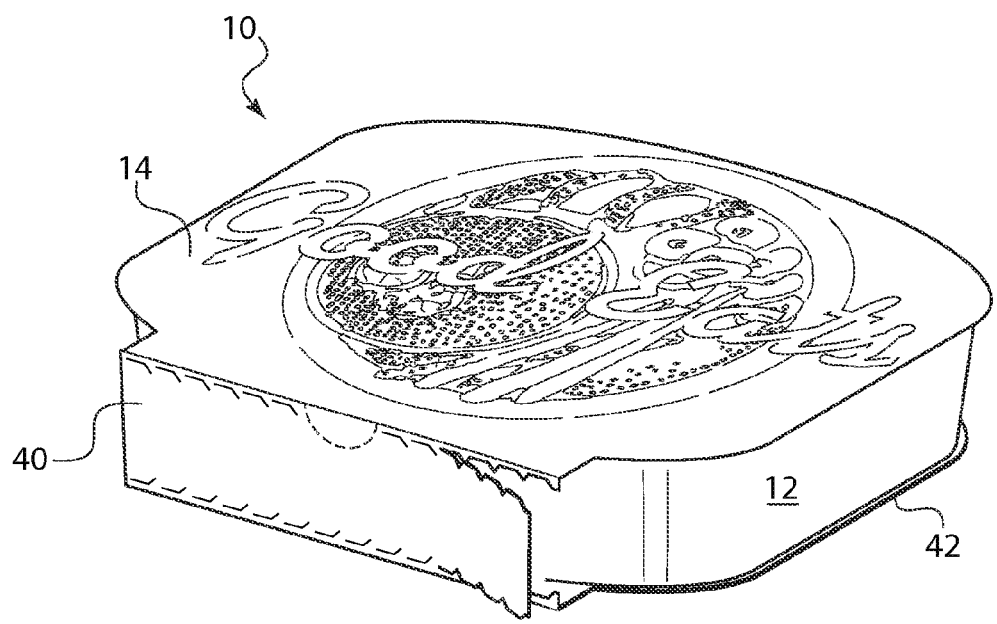
FIG. 1 shows a top perspective view of a lidding device in place on a food container.

The figures illustrate various embodiments of a lidding device 10. As shown in the Figures, the lidding device 10 comprises three panels: a first panel 14 separated from a third panel 42 by a second panel 40. Any of the panels may include marketing materials, product identifiers and information, or graphics. The first panel 14 forms a lid that covers and seals the contents of a food container 12. The second panel forms a foot 46 that is useful for display purposes. The third panel 42 provides a base panel.

A thermoplastic or heat seal coating may be applied to the food-facing side of the first panel 14, which is the side that interacts with the container 12 to seal the contents of the container. The heat seal coating is applied at suitable places around the panel. This coating also acts as a barrier to protect the lid from water/oils in the product(s) stored in the container. In some embodiments, the thermoplastic coating is a polyolefin dispersion, although other water or solvent-based coatings that provide a suitable seal between the device and the container may be used. For example, polymeric based films, which may be adhesively laminated to the paperboard blank or directly extrusion coated to the blank, may be used. In some embodiments, the heat sealable coating is applied to the underside of substantially the entirety of the first panel 14 so that it faces and covers/seals the contents of the container. In some cases, the coating consists of a heat sealable adhesive that is applied to the paperboard blank as part of production before the blank is cut, and in other cases is applied afterwards. The coated paperboard is configured to withstand a range of environmental conditions relating to manufacture, transportation, storage (which may include freezing), sale, and use of the product, which may include defrosting and/or heating (such as by microwave oven, conventional oven, convection oven, and/or toaster oven) of the product stored within the food container. The coated paperboard is also configured to be safe for contact with food products in compliance with 21 CFR 176.170.

One specific embodiment of a lidding device 10 that is useful for covering and sealing a food product container 12 is illustrated by FIG. 1. Appropriate food product containers 12 are typically made of plastic, but may be made of any appropriate material that can house and store food, and that also allow the food to be cooked therein. Such containers are commonly recognizable as the type of containers that are used for microwavable food products, but they may also be used in conventional ovens, toaster ovens, or convection ovens.

The lidding device 10 that is used to cover and protect the food contained in the container 12 is typically made of paperboard, but may be made of any printable, foldable, fiber-based substrate. In a particular embodiment, the lidding device 10 is made of a two-sided clay coated SBS (Solid Bleached Sulfate) having an appropriate coating as described above applied thereto, although it should be understood that any food-safe lidding material may be used.

Figure 2:
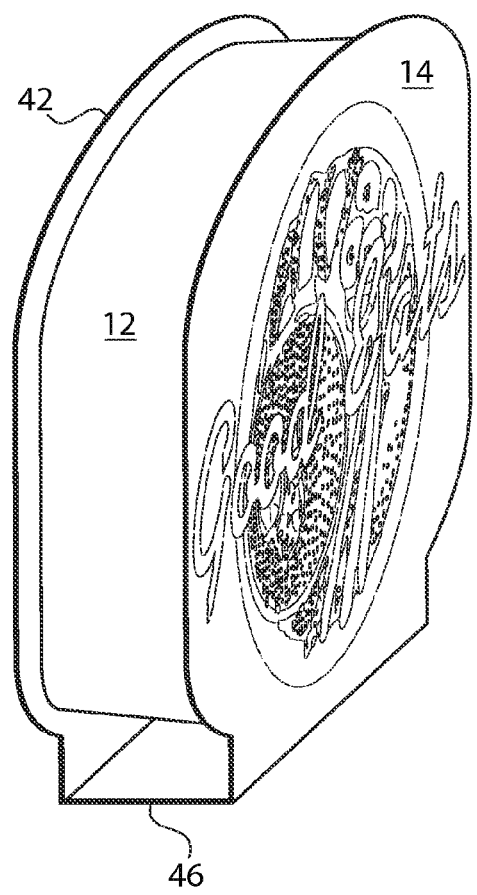
FIG. 2 shows the device of FIG. 1 standing on its foot panel.

The lidding device 10 provides a three-panel system that covers the top and bottom of the food container 12, as well as provides a side panel that functions as a connecting panel, which also provides a display function. As shown in FIG. 2, a first panel 14 is provided to form the cover or lid panel of the lidding device. The first panel may have an opening feature that allows for venting during the heating process. For example, first panel may have a venting system 20, as will be described in more detail with respect to further figures, and venting system 20 may be provided in a number of ways. For example, the venting and/or opening feature may include lines of weakness that are configured to be broken and/or removed or displaced to provide ventilation. Optionally, a pull tab or tear strip adjacent the opening feature may be used to move the opening feature into its vent position.

Figure 3:
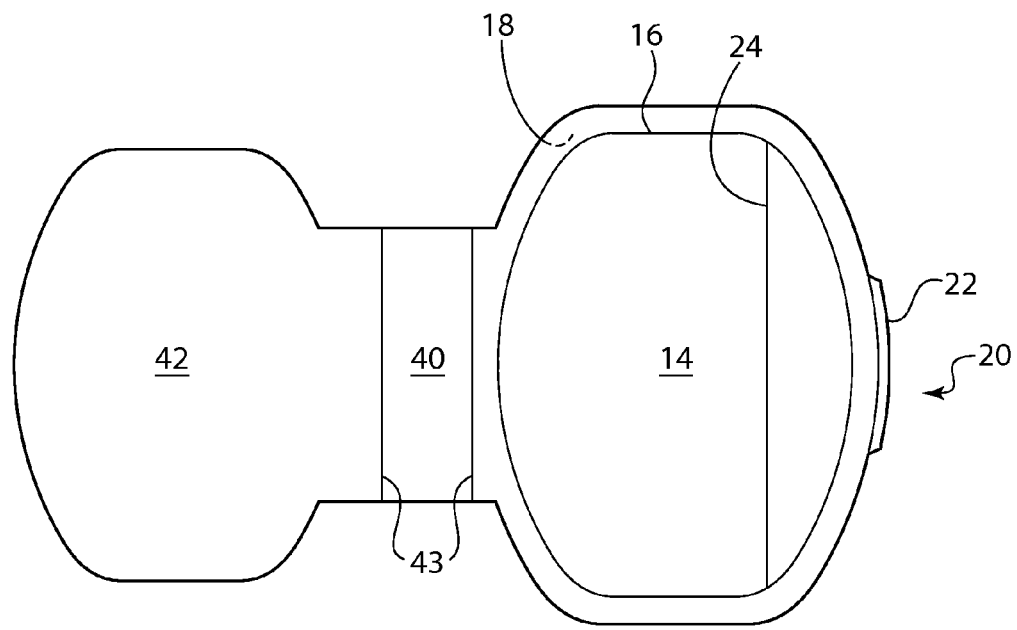
FIG. 3 shows a top plan view one embodiment of a blank that may be used to form lidding device.
Figure 4:
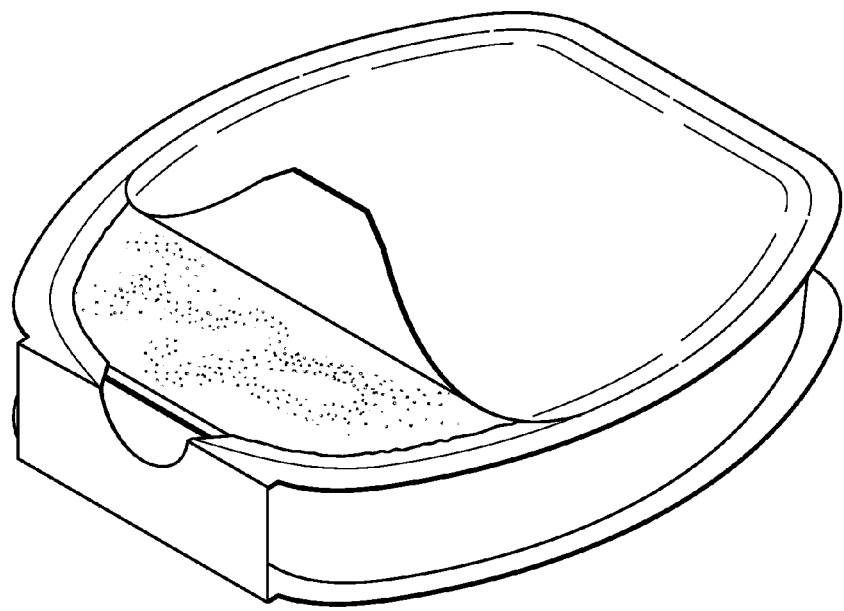
FIG. 4 shows a side perspective view of one embodiment of how a lidding device may be opened to vent food and to remove the lid panel.

Specifically, as shown in FIG. 3, first panel 14 has one or more lines of weakness 16 provided along its edge areas 18, which allows the first panel 14 to be removed before, during and/or after the cooking process. Lines of weakness 16 may be provided as perforations, score lines, partial cuts, reverse partial cuts, or any other feature that allows the first panel 14 to be broken, removed or displaced upon application of the appropriate amount of pressure. These lines 16 may assist with the venting, but they may also be used to remove the entire lid panel 14 from the container 12, as shown in FIG. 4.

Figure 5:
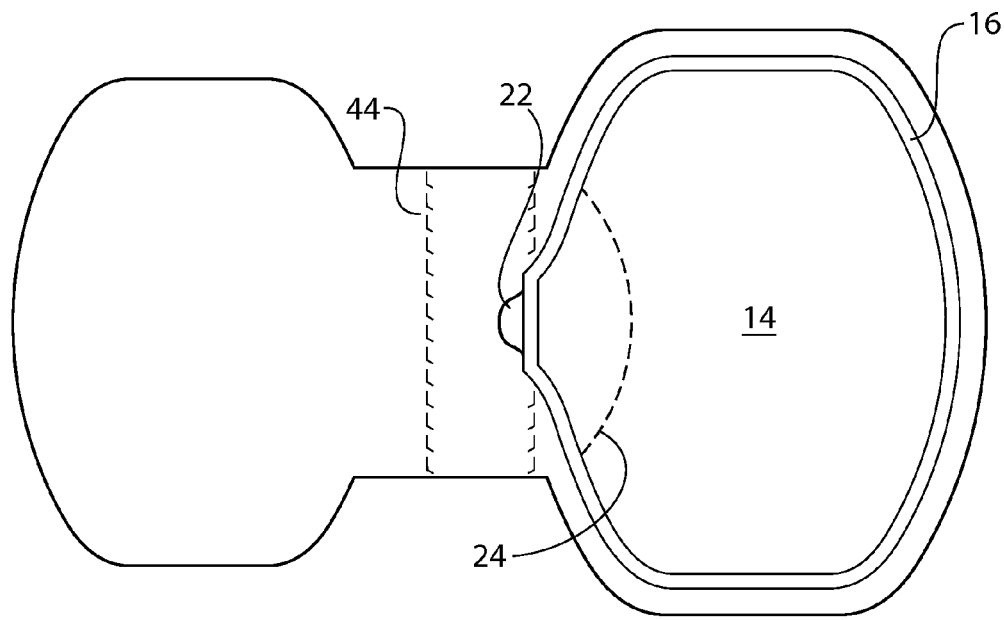
FIG. 5 shows a top plan view of an alternate blank that may be used to form a lidding device.
Figure 6:
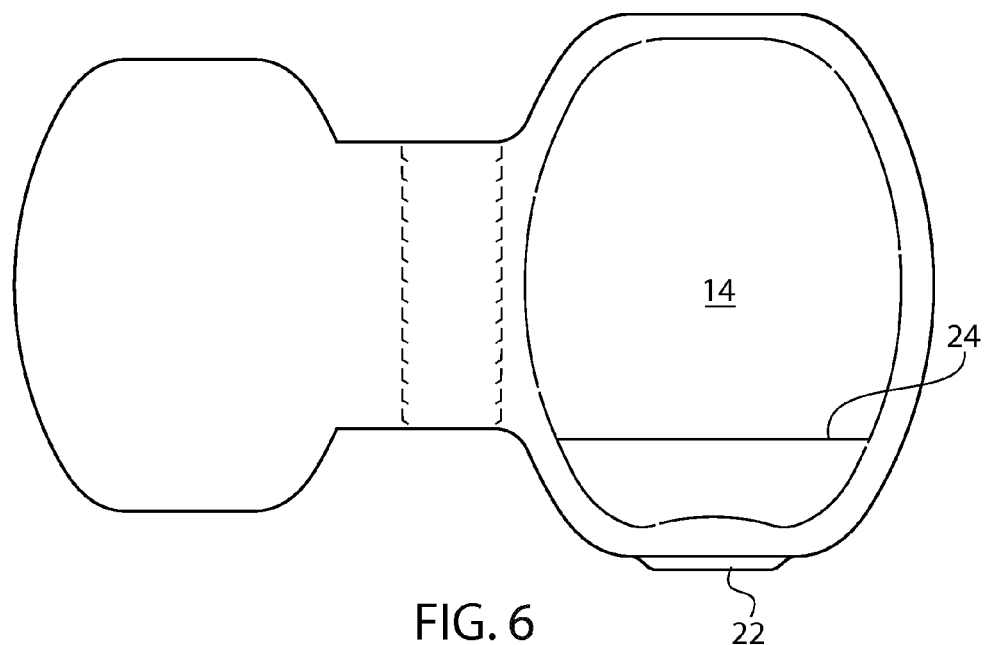
FIG. 6 shows a top plan view of a further alternate blank that may be used to form a lidding device.
Figure 7:
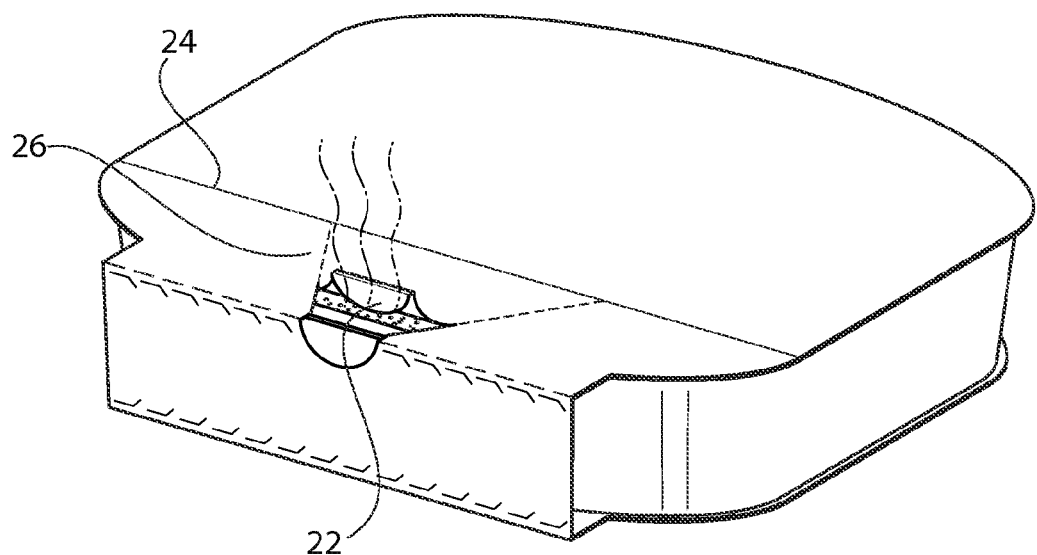
FIG. 7 shows a side perspective view of an alternate embodiment of a lidding device being vented.

FIG. 3 also shows an embodiment of a venting system 20 that is created via cooperation between a pull tab 22 and a score line 24. In use, the user grasps pull tab 22 and pulls a portion of the panel lid 14 back to the area where the score line 24 is located in order to create an opening in the panel lid 14. The pull tab 22 is generally located near the side of the panel where the venting score line 24 is located. The pull tab 22/score line 24 system may be provided near the right side of the panel 14 (FIG. 3), along the left side of the panel 14 (FIG. 5) or along the top (or bottom) of the panel 14 (FIG. 6). Pull tab 22 may be any appropriate shape, such as a rectangular tab (FIGS. 3 and 6) or a rounded protrusion (FIG. 5). As the edge portion of the panel lid is pulled back, the lines of weakness 16 that secured the lid in place are disrupted, and they allow a peeling back of the lid portion to the score line 24. It is also possible to create further lines of weakness 26 that extend between the tab 22 and the score line 24, in order to further ease the peeling back of the lid, if desired or necessary.

Figure 8:
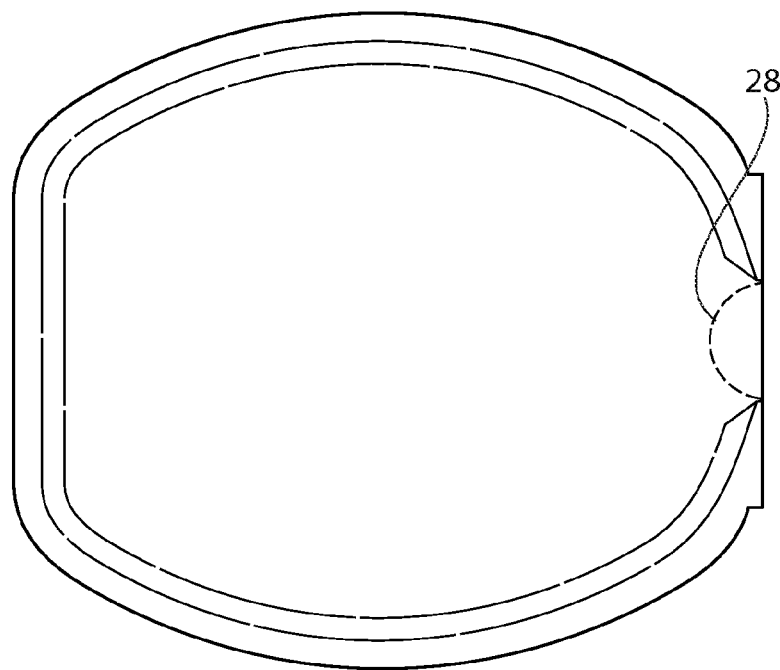
FIG. 8 shows a top plan view of a lidding device in place on a food container, the lidding device having a perforation for its venting system.
Figure 9:
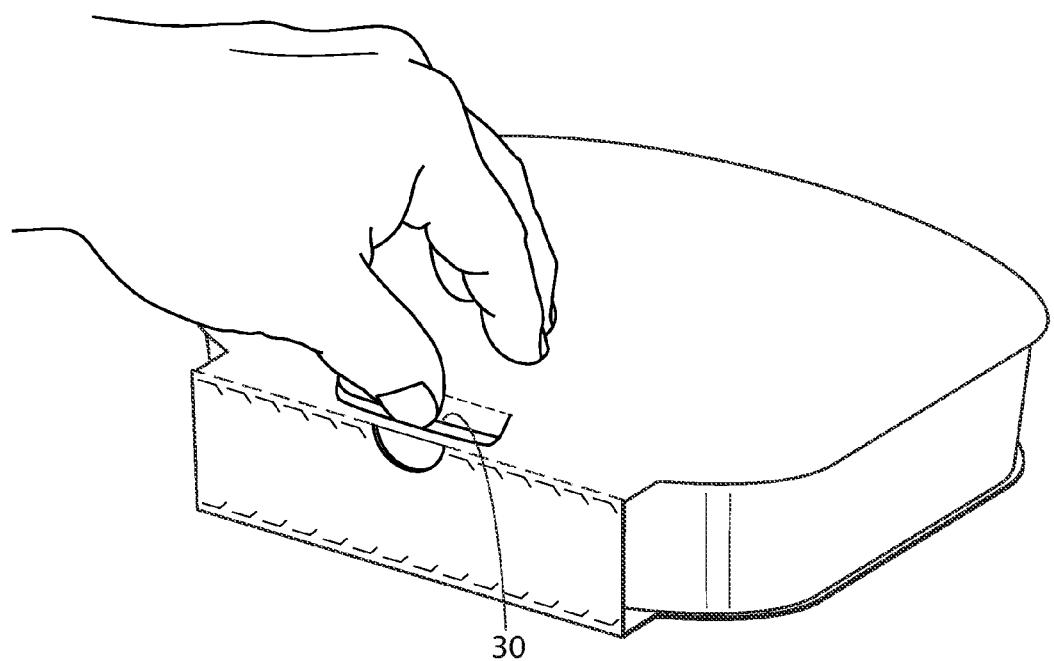
FIG. 9 shows a side perspective view of an alternate venting system for a lidding device.

In an alternate embodiment, no tab is required, but a line of weakness 28 is provided as the venting system 20, as shown in FIG. 8. In use, finger pressure may be used along the venting line of weakness 28 to create the desired opening. This line of weakness 28 may be formed as a shape 28 that could be peeled back or punched out/removed completely, as shown in FIG. 8. Alternatively, this portion may be provided as a single perforated line 30 that is punctured to create a venting slit or hole, as shown in FIG. 9.

Figure 10:
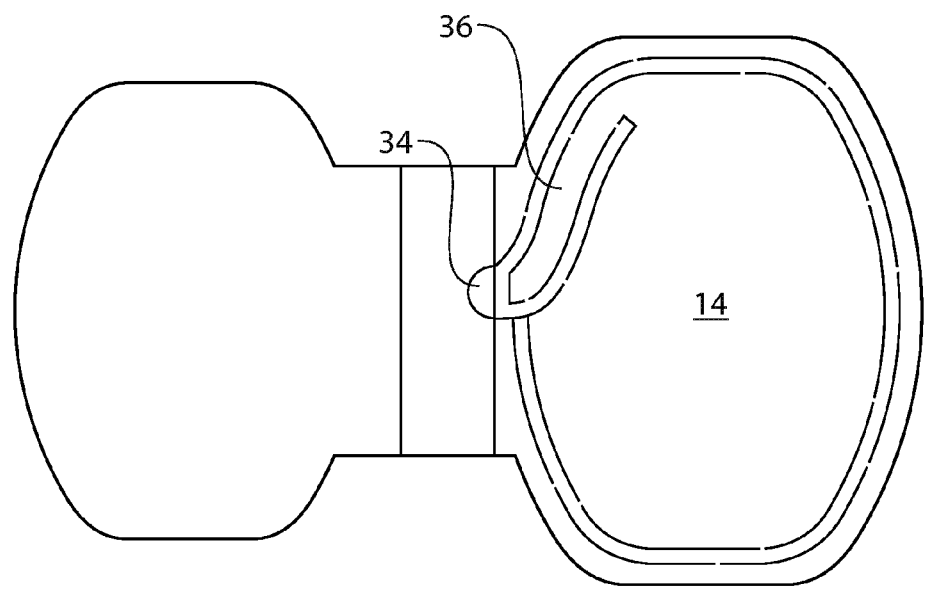
FIG. 10 shows a top plan view of one lidding device blank that has a tear strip feature.
Figure 11:
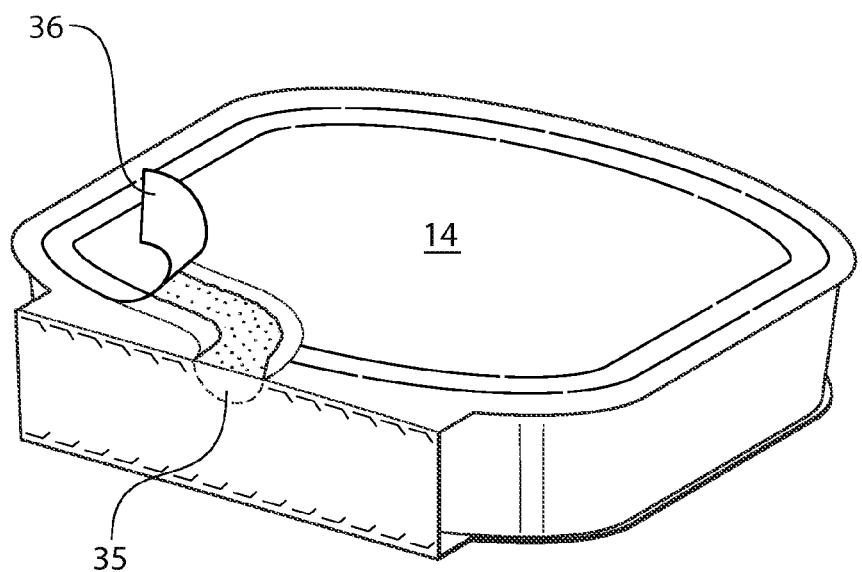
FIG. 11 shows a side perspective view of a lidding device with an alternate tear strip feature being vented.

In a further embodiment, a pull open tear strip 32 may be provided, as shown in FIG. 10. The pull open tear strip 32 features a thumb tab 34 connected to a tear strip feature 36 that travels along an edge of the panel lid 14. In an alternate embodiment as shown in FIG. 11, instead of a thumb tab, there is a puncturable/covered opening 35 provided in the lid where a thumb may punch out the removable portion, insert a thumb, and grasp the tear strip feature 36.

Figure 13:
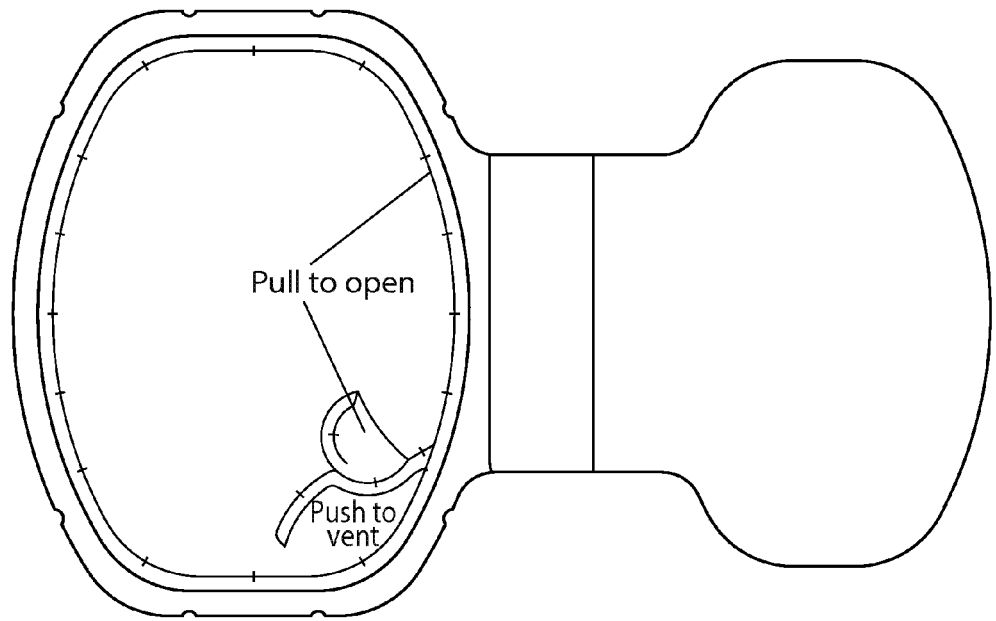
FIG. 13 illustrates top plan view of a blank that has a push to vent feature.
Figure 14:
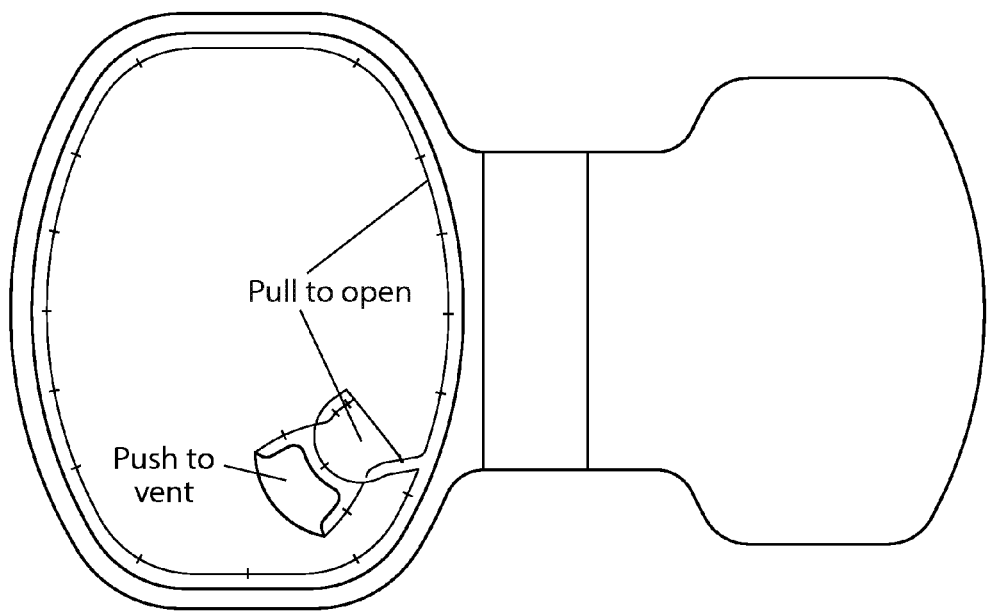
FIG. 14 illustrates top plan view of a blank that has an alternate push to vent feature.
Figure 15:
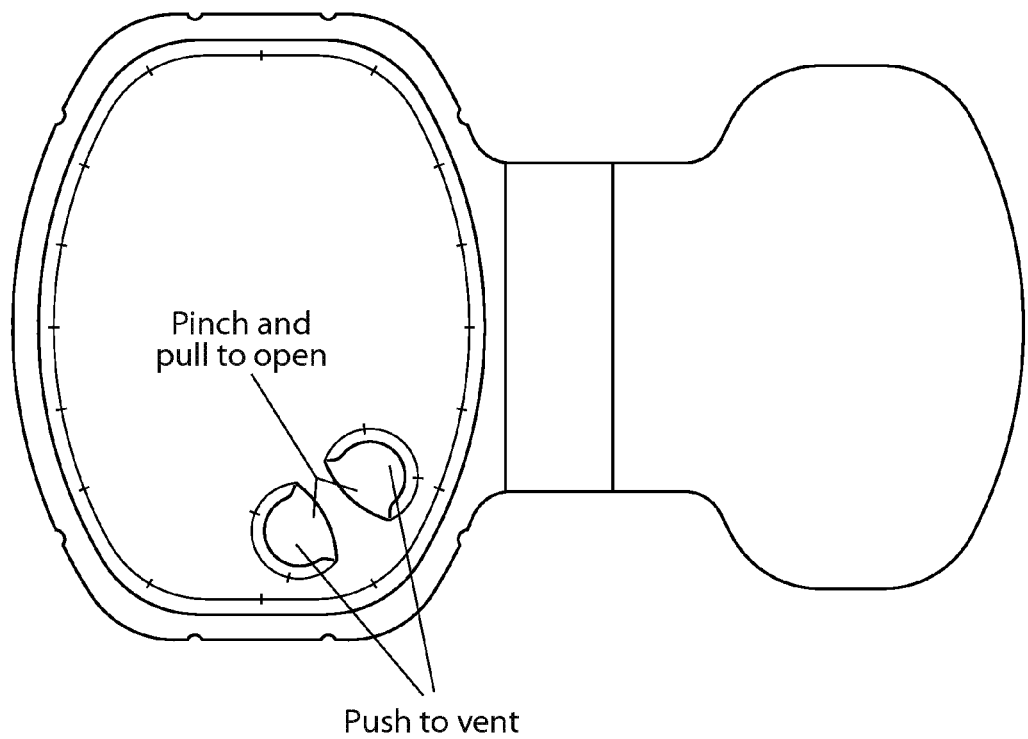
FIG. 15 illustrates top plan view of a blank that has a push to vent and pinch to pull and open feature.

In a further embodiment, there may be provided a push to vent feature in the lid. One embodiment of a simple push to vent feature is shown in FIG. 9, where the opening 30 is created by thumb pressure along the perforated line. More fully developed embodiments of push to vent features are shown in FIGS. 13-15. For example, FIG. 13 shows a push to vent feature 48 which is adjacent to a pull to open feature 50. The user may press at the push to vent 48 portion in order to create a venting area. Once the cooking/heating process has been completed, the user may then grasp the pull to open 50 portion to remove the lid from the food container.

An alternate embodiment of a push to vent feature is shown in FIG. 14. This figure illustrates back-to-back push to vent 48 and pull to open 50 areas. A further embodiment provides a pinch to open feature 52, as shown in FIG. 15. In this embodiment, two push to vent features are provided as semi-circles 54 formed as perforations in the lid. After the semi-circles 54 are pressed in for venting during cooking/heating, they may be used to pinch the lid to open. The space 56 between the semi-circles creates somewhat of a handle for the user to raise the lid.

Although a number of alternate embodiments for venting system are shown and described, it should be understood that any configuration that provides a venting system may be used in connection with the three-panel lid disclosed herein. Regardless of the embodiment provided, upon appropriate pressure or pulling at the venting system 20, the first panel 14 opens or separates from the container 12, allowing air to vent into and from the food container during cooking. In some embodiments, the first panel is removed before serving and consumption. Once the food has cooked completely, the entire panel lid 14 may be removed, as shown in FIG. 4. The edge lines of weakness 16 may assist with this removal.

Figure 12:
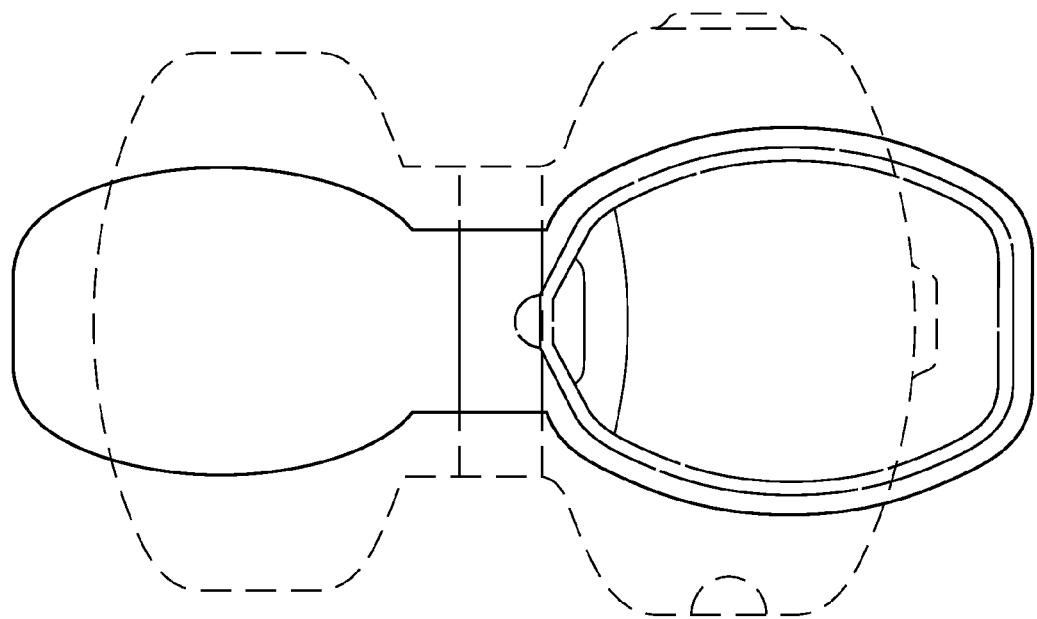
FIG. 12 illustrates that any number of lidding device configurations may be used, with various tabs at various locations and various perforation/score line locations.

FIG. 12 illustrates that alternate shapes and sizes for the panels may be provided, depending upon the shape and size of the container to be lidded. In general, however, the first panel 14 is generally shaped to cover a food product container 12, albeit slightly larger than the opening of the container so that the entire opening of the container 12 is covered. The tabs may be positioned at any appropriate location, the score lines may be interchanged for perforations and vice versa, and alternate venting systems may be provided.

Reference is now made back to FIGS. 3, 5, 6, 8, and 12, which show embodiments of the lidded device blank prior to its being folded, shaped, and enclosing a container 12. A second panel 40 is connected to the first panel 14. As shown in FIG. 10, second panel 40 is positioned between and separates the first panel 14 and the third panel 42. The connection areas are generally via either score lines 43 or small cuts or perforations 44 in the blank that allow easy removal of the second panel 40 from the first and third panels 14, 42 in use. Although score lines 43 are shown in some figures are perforations 44 in others, it should be understood that these features may be interchangeable and/or used collectively. (It is expected that perforations will ease complete removal of the panels for serving purposes, however.)

The second panel 40 generally forms a side or bottom panel (depending upon how the device 10 is positioned). In some embodiments, the second panel is configured to serve as a foot 46 that keeps the bowl upright, as shown in FIG. 2. Once the lidded device 10 is folded and positioned with respect to a food container 12, the foot 46 can be used to allow the device 10 to stand thereon, such that the device can be easily stacked in a freezer, refrigerator, or shelf section, while still displaying the package printing and taking up less space than if the containers were stacked vertically.

Any or all of the panels have at least one (or both) side(s) that are configured to be printable for printing product identifying material and/or instructions thereon. For example, the non-food facing side of the first panel 14 generally contains brand and product messaging or images, while additional information, such as a list of ingredients and cooking and/or opening instructions, may be included on another panel, such as the second and/or or third panels.

Also disclosed is a method of forming a lidding device. In one embodiment, the device may be formed using standard paperboard forming machinery to form a die-cut blank, having various lines of weakness, such as score lines and/or perforations, positioned thereon. A clay coating is then applied to the blank. Next, the suitable thermoplastic heat seal coating is applied to one side of the blank, which will generally be the food-facing side of at least the first panel 14. Alternatively, the thermoplastic heat seal coating may be applied during manufacture of the paperboard out of which the blank is cut. The paperboard may be printed with heat resistant microwaveable inks and/or overprint. Moreover, the blank used to form the lidding device may be die cut to a customer's specifications, depending upon the shape of the food container to be covered and sealed.

In use, the container 12 is filled with food (or other product) and the lidding device 10 is folded and formed from the blank and wrapped around the container 12. Heat sealing equipment may then be used to activate the heat sealable coating to bind the paperboard to the container. In other embodiments, ultrasonic or radio frequency sealing technology may be used to activate the heat sealable coating. This may be done using any suitable machinery or method.

Different arrangements of the components depicted in the drawings or described above, as well as components and steps not shown or described, are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawing, and changes and modifications, additions and deletions may be made to the structures and methods recited above and shown in the drawings without departing from the scope or spirit of the invention and the following claims.

What is claimed is:

1. A lidding device, comprising:
a first panel comprising a lid configured to cover and directly seal contents of a food container, the first panel comprising a venting system formed by a pinch to open feature comprising two vent features formed as perforated semi-circles that are pressed in for venting during heating and pinched to open the lid when heating is complete, wherein the first panel further comprises a food-facing side having a heat sealable coating on substantially the entirety of the food-facing side;
a second panel; and
a third panel comprising a bottom panel, wherein the second panel is connected to the first panel and the third panel via perforations for removal of the panels from one another.

* * * * *